United States Patent
Kramer et al.

(10) Patent No.: US 9,540,046 B2
(45) Date of Patent: Jan. 10, 2017

(54) SUBFRAME FOR A MOTOR VEHICLE

(71) Applicant: AUDI AG, Ingolstadt (DE)

(72) Inventors: Tobias Kramer, Stammham (DE); Jakob Bosch, Aulendorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/910,942

(22) PCT Filed: Jul. 25, 2014

(86) PCT No.: PCT/EP2014/002039
§ 371 (c)(1),
(2) Date: Feb. 8, 2016

(87) PCT Pub. No.: WO2015/018501
PCT Pub. Date: Feb. 12, 2015

(65) Prior Publication Data
US 2016/0194029 A1    Jul. 7, 2016

(30) Foreign Application Priority Data

Aug. 9, 2013    (DE) .......................... 10 2013 013 325

(51) Int. Cl.
| | | |
|---|---|---|
| *B62D 21/11* | (2006.01) | |
| *B60G 21/055* | (2006.01) | |
| *B60G 11/18* | (2006.01) | |

(52) U.S. Cl.
CPC ............. *B62D 21/11* (2013.01); *B60G 11/181* (2013.01); *B60G 21/0555* (2013.01);
(Continued)

(58) Field of Classification Search
CPC .............................. B62D 21/11; B60G 11/181
See application file for complete search history.

(56) References Cited

U.S. PATENT DOCUMENTS 5,879,026 A * 3/1999 Dostert .................... B60G 3/24
                                                                180/311
6,511,096 B1 * 1/2003 Kunert .................... B60G 7/02
                                                                280/124.109
(Continued)

FOREIGN PATENT DOCUMENTS

| DE | 199 01 849 A1 | 7/2000 |
|---|---|---|
| DE | 101 07 960 A1 | 8/2002 |

(Continued)

OTHER PUBLICATIONS

International Search Report issued by the European Patent Office in International Application PCT/EP2014/002039.

*Primary Examiner* — Drew Brown
(74) *Attorney, Agent, or Firm* — Henry M. Feiereisen LLC (57) ABSTRACT

The invention relates to a subframe for a motor vehicle, comprising two front node elements (1) for connecting to a vehicle body, which node elements are spaced from each other in a vehicle transverse direction (y) and are connected to each other by means of a front subframe cross member (3), and comprising at least one functional part (28), in particular a rotary actuator, which extends adjacently to the subframe cross member (3) in a vehicle transverse direction (y), by means of which functional part a torsion can be applied to torsion springs that act on the vehicle wheel suspension. According to the invention, the subframe cross member (3) has an opening, which provides an additional installation space, in which the functional part (28) at least partially protrudes.

14 Claims, 6 Drawing Sheets

(52) U.S. Cl.
CPC .......... *B60G 2204/122* (2013.01); *B60G 2204/1222* (2013.01); *B60G 2204/15* (2013.01)

(56) References Cited

U.S. PATENT DOCUMENTS

| | | | | |
|---|---|---|---|---|
| 7,584,815 | B2* | 9/2009 | Ogawa | B60G 3/20 180/312 |
| 8,403,347 | B2* | 3/2013 | Eickmann | B60G 21/0551 180/312 |
| 8,925,942 | B2* | 1/2015 | Buschjohann | B62D 3/12 280/124.109 |
| 2003/0047896 | A1 | 3/2003 | Lee | |
| 2004/0021285 | A1* | 2/2004 | Frasch | B60G 21/0551 280/124.109 |
| 2007/0108802 | A1* | 5/2007 | Gunther | B62D 21/11 296/203.02 |
| 2012/0104739 | A1* | 5/2012 | Buschjohann | B22D 19/0072 280/781 |
| 2012/0211962 | A1* | 8/2012 | Schmitz | B62D 21/11 280/124.128 |
| 2013/0241186 | A1* | 9/2013 | Shibaya | B62D 21/00 280/781 |
| 2015/0014955 | A1* | 1/2015 | Leibl | B60G 3/20 280/124.107 |
| 2016/0152270 | A1* | 6/2016 | Kondo | B62D 21/00 280/124.109 |

FOREIGN PATENT DOCUMENTS

| | | |
|---|---|---|
| DE | 102 29 161 A1 | 4/2003 |
| DE | 10 2004 057 176 A1 | 3/2006 |
| DE | 10 2004 058 380 A1 | 6/2006 |
| DE | 10 2005 055 396 A1 | 5/2007 |
| DE | 10 2011 018 574 A1 | 10/2012 |
| EP | 0 530 594 A1 | 3/1993 |
| EP | 1 577 195 A2 | 9/2005 |
| EP | 1 686 042 A1 | 8/2006 |
| EP | 2 093 131 A2 | 8/2009 |
| FR | 2 947 512 A1 | 1/2011 |

* cited by examiner

SUBFRAME FOR A MOTOR VEHICLE

CROSS-REFERENCES TO RELATED APPLICATIONS

This application is the U.S. National Stage of International Application No. PCT/EP2014/002039, filed Jul. 25, 2014, which designated the United States and has been published as International Publication No. WO 2015/018501 and which claims priority of German Patent Application, Serial No. 10 2013 013 325.4, filed Aug. 9, 2013, pursuant to 35 U.S.C. 119(a)-(d).

BACKGROUND OF THE INVENTION

The present invention relates to a subframe for a motor vehicle.

DE 102 29 161 B4 discloses such a subframe for a motor vehicle. Bolted to the front subframe cross member of the subframe is the housing of a rack-and-pinion steering. For this purpose, bearing mounts in the form of half-shells are provided on the subframe cross member, configured as upright profile, for securement of the steering housing which is approximately circular-symmetrical in cross section. The subframe cross member is rigid as a result of the rectangular cross sectional shape that is oriented in vertical: direction, which is of advantage for wheel guide elements of wheel suspensions that are normally articulated to the subframe and, optionally, for the suspension of a drive unit.

DE 10 2004 058 380 A1 discloses a generic subframe, having wheel guide elements articulated thereto. Viewed in the vehicle longitudinal direction, provision is made for functional parts of the wheel suspensions on both sides of the front subframe cross member. The functional parts are, on one hand, the housing of a rack-and-pinion steering, which is arranged in travel direction of travel behind the subframe cross member, and, on the other hand, a U-shaped torsion bar stabilizer, as viewed in plan view, which is arranged in travel direction anteriorly of the subframe cross member.

In an active chassis system, a space-intensive rotary actuator can be used instead of such a U-shaped torsion bar stabilizer in order to act upon the vehicle wheel suspension via torsion spring bars. The rotary actuator can be used to compensate, depending on the control, the vehicle height and/or pitching and rolling motions of the motor vehicle. The rotary actuator requires additional installation space in the vehicle front which, however, is very limited due to the high space requirements for the drive units.

To provide additional installation space, the subframe cross member could be installed not as an upright profile, but in the form of a flat profile substantially horizontally in the subframe. However, such a flat profile arrangement adversely affects the stiffness of the subframe.

SUMMARY OF THE INVENTION

The object of the invention is to provide a subframe for a motor vehicle, which subframe enables a spatially beneficial arrangement at least of one adjacent functional part of the wheel suspensions while maintaining a high bending stiffness of the subframe cross member and being of simple, lightweight construction.

The object is achieved in accordance with the invention by a subframe for a motor vehicle, including two front node elements arranged in a vehicle transverse direction in spaced-apart relation for connection to a vehicle body, which are connected to one another via a front subframe cross member, and at least functional part, in particular at least one rotary actuator, extending in a vehicle transverse direction adjacent to the subframe cross member to subject torsion spring bars, acting on the vehicle wheel suspension, to a torsion, wherein the subframe cross member has an opening to provide an additional installation space in which the functional part protrudes at least in part. The proposed measure substantially maintains the bending stiffness of the subframe cross member, despite a reduction in weight (due to the opening), and an adjacent functional part can be arranged spatially closer to the subframe cross member, thereby realizing a significant advantage, when considering the spatial confinement of structural components articulated to and arranged on the subframe in the motor vehicle (wheel guide elements, assembly bearings, steering systems, actuators, etc.).

Advantageous refinements and configurations of the invention are set forth in the dependent claims.

In terms of a reliable stiffness of the subframe, it is of advantage when the subframe cross member is an upright profile with at least one cross member wall. The opening is arranged in the cross member wall. To further enhance the transverse stiffness of the subframe, the subframe cross member can delimit the opening in the shape of a closed frame, specifically with upper and lower wall frame parts in the vehicle vertical direction and lateral wall frame parts in the vehicle transverse direction. All wall frame parts may, preferably, be configured of same material and/or in one piece in the cross member wall.

The subframe cross member may, preferably, define a cavity, specifically in the travel direction with a front cross member wall and a rear cross member wall. The hollow profile of the subframe cross member can, viewed in the vehicle vertical direction, be delimited by an upper flange and a lower flange, between which the vertically arranged cross member walls extend.

Formed in each of the two cross member walls is an opening. This is particularly advantageous when the ratio of height to width of the subframe cross member is relatively large or the subframe cross member is designed relatively narrow but with high bending stiffness in Z direction.

The outer circumference of the functional part can be substantially circular in shape, wherein the height of the openings can have variable dimensions to suit a contour of the engaging functional part.

When the functional part is configured as a rotary actuator, the torsion spring bars thereof can be arranged, when viewed in the vehicle longitudinal direction, in spaced-apart relation and outside of the opening provided by the subframe cross member. For further stiffening of the subframe cross member, at least one of the frame wall parts of the subframe cross member can be folded obliquely with an angle of incline, in particular a lower frame wall part of the cross member wall that is arranged in closer proximity to the functional part in the travel direction. The obliquely folded frame wall part can, moreover, form with the adjacent cross member wall a framework structure with a closed hollow profile and in particular welded therewith. In this way, the bending stiffness of the subframe cross member is additionally enhanced while keeping added construction costs small.

The openings are provided in the cross member walls without breach of the upper flange and the lower flange, wherein the at least one functional part, viewed in the vertical projection, is able to protrude into the subframe cross member. The outer circumference of the functional part may hereby be substantially circular-symmetrical, with the height of the recesses, extending in the transverse direction being variable depending on the overlap with the outer circumference of the functional part.

According to a further configuration of the invention, the wall in closer proximity to the functional part can be folded obliquely in the region of the recess starting from the upper flange and/or lower flange. Thus, when the functional part is arranged in close relation to the subframe cross member, a clearance can be produced to a greater extent between the functional part and the subframe cross member.

A structurally advantageous, compact construction of the subframe involves that the subframe cross member can be combined with a traverse bar which carries at least one of the functional parts, with the traverse bar particularly preferably forming simultaneously the lower flange of the subframe cross member for firm placement of at least one of the upright cross member walls via welded joints.

According to a further preferred configuration of the invention, provision may be made for transversely extending functional parts adjacent to the subframe cross member on both sides, with at least one functional part protruding into the recesses of the subframe cross member.

The one functional part may hereby be the housing of a steering system (of a rack-and-pinion steering or of two steering actuators) and the other functional part an actuator acting upon torsion bar stabilizers, wherein, preferably, at least the housing of the actuator between the torsion bar stabilizers respectively protruding into the subframe cross member. The split torsion bar stabilizers can be maintained under variable tension, for example electromechanically, to act on the wheel guide elements via the actuator, when an active suspension is involved.

Finally, the subframe cross member approximately rectangular in cross-section can be connected via vertically oriented bearing eyelets to upwardly oriented cast nodes of the subframe, to which in addition the longitudinal members and cross-connecting metal sheets are connected, in particular bolted, with the steering system and the torsion bar stabilizers of the actuator being guided through the cast nodes.

The advantageous configurations and/or refinements of the invention. as described above and/or set forth in the sub-claims can used individually or also in any combination with one another—except, for example, in cases of clear dependencies or incompatible alternatives.

BRIEF DESCRIPTION OF THE DRAWING

The invention and its advantageous configurations and/or refinements and its advantages are explained in more detail with reference to drawings.

It is shown in.

DETAILED DESCRIPTION OF PREFERRED EMBODIMENTS

Figure 1:
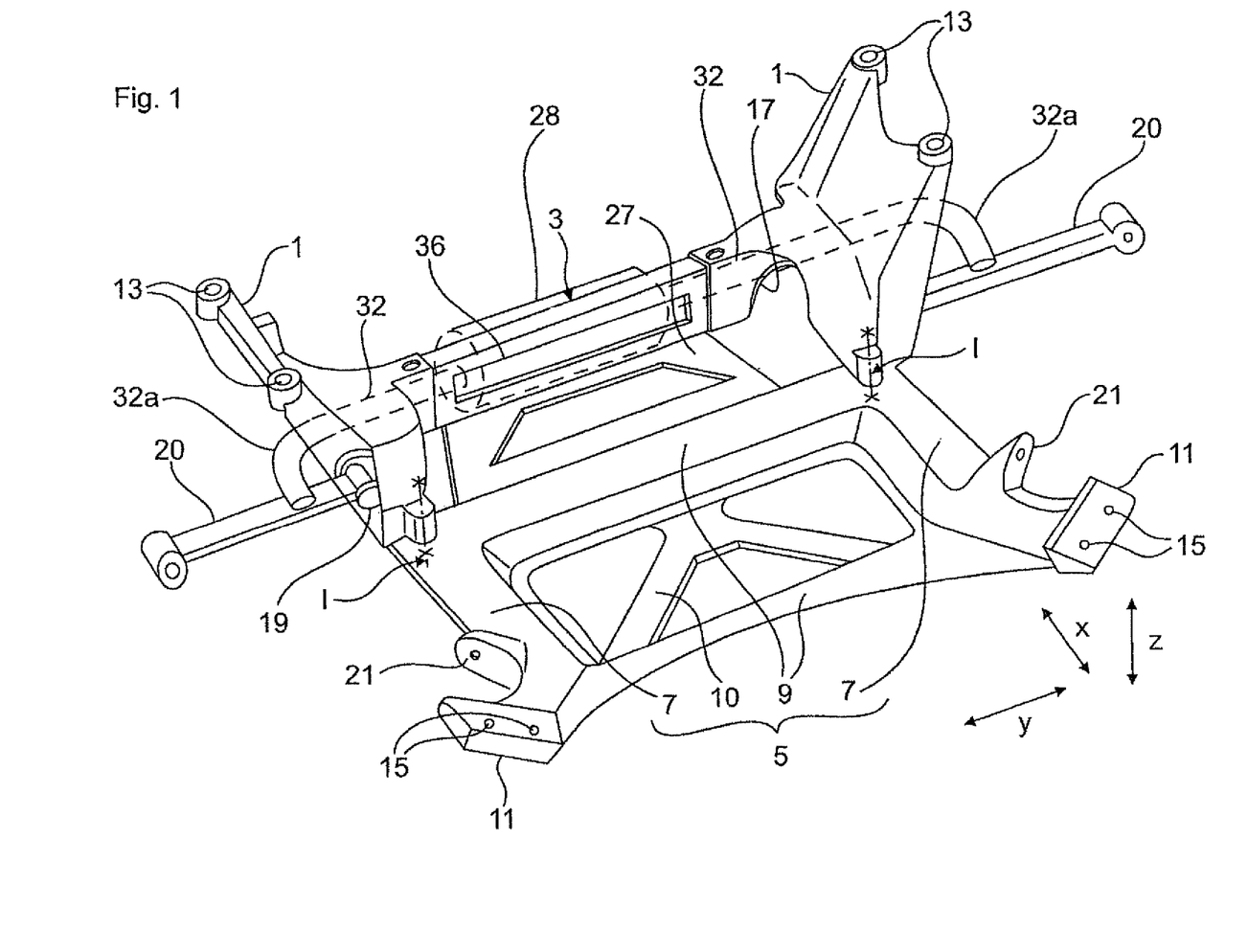
FIG. 1 a perspective illustration of the assembled state of a subframe.

FIG. 1 shows a subframe in isolation. The subframe has in the vehicle longitudinal direction x on either side front node elements 1, which are formed here by way of example as box-shaped aluminum cast nodes. The two node elements 1 are connected in the vehicle transverse direction y with a subframe cross member 3. Adjoining the two front cast nodes 1 in the vehicle longitudinal direction x to the rear is a flat, plate-shaped reinforcement element 5 which is configured substantially like a framework with longitudinal struts 7, transverse struts 9, and diagonal struts 10. Rear node elements 11 are formed integrally on the reinforcement element 5 of same material and in one piece at the rear end of the reinforcement element 5.

Figure 2:
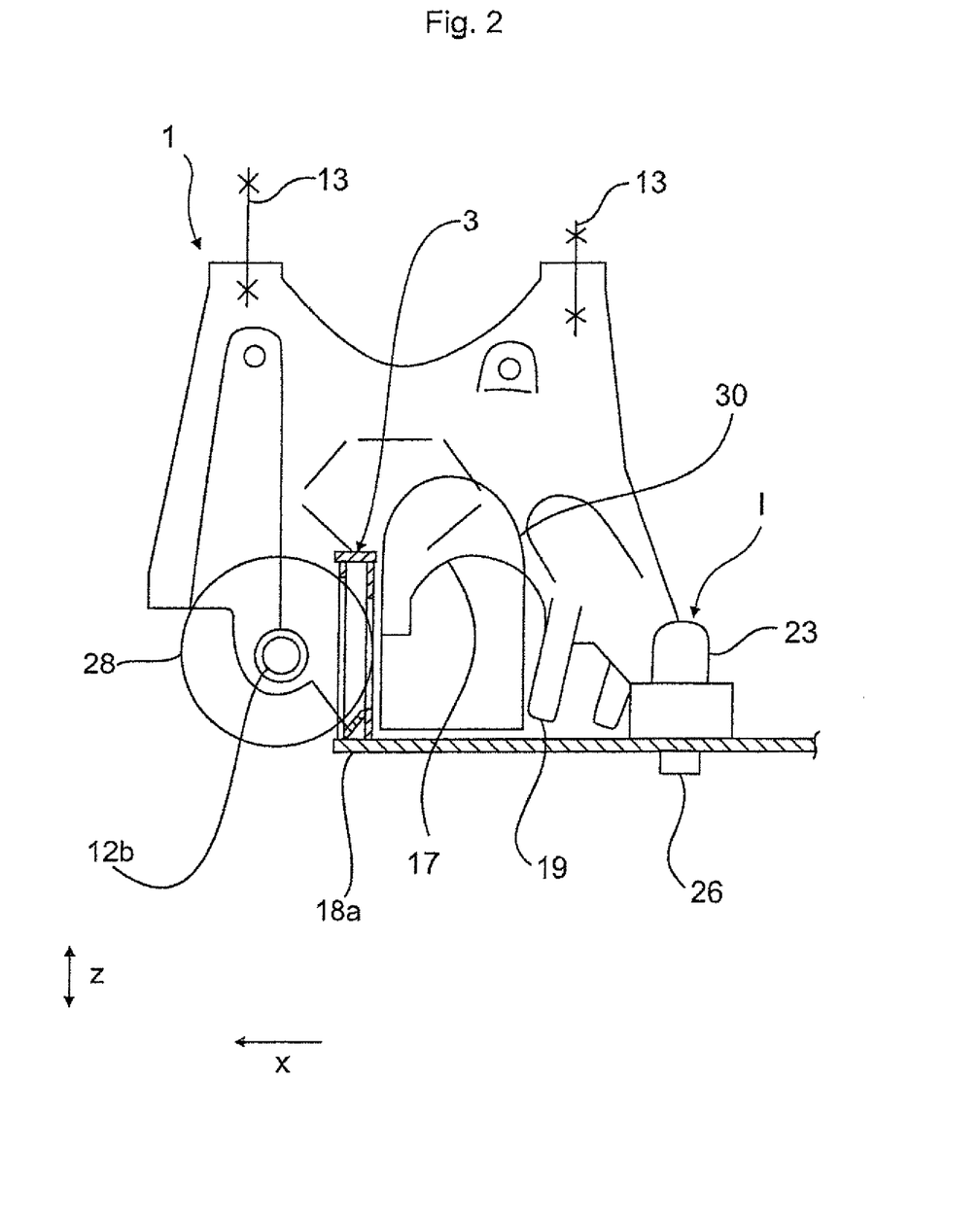
FIG. 2 a partial longitudinal section through the forward region of the subframe with the respective installation space, indicated dash-dotted, for the functional parts that are positioned in immediate proximity adjacent to the subframe cross member on both sides.

The two front node elements 1 have each on the upper side screw holes 13 for connection to a not shown body longitudinal member. Conversely, the two rear node elements 11 have each screw holes 15 for connection to the longitudinal member at the base of the A pillar of the vehicle body. Provided beneath the screw holes 13 of the two front node elements 1 is a steering slot 17 and an only indicated steering mount 19 for articulation of wheel suspension control arms 20, indicated only in part. Steering rods of a not shown steering gear are routed through the two steering slots 17 of the front node elements 1. The steering gear is indicated by dash-dot lines in FIGS. 2 and 5 and designated by reference numeral 30. Consequently, the steering gear 30 is arranged in the travel direction x behind the front subframe cross member. 3. In addition to the screw holes 15, steering mounts 21 are also provided for the rear wheel suspension control arms in the two rear node elements 11.

According to FIG. 1, the forward end of the flat reinforcement element 5 is laterally connected via first attachment sites I with the two front node elements 1. Each of the first attachment sites I is configured with a rear threaded mount 23 (FIG. 2) which is formed on the node element 1 and to which the reinforcement member 5 is bolted. Approximately centrally between these two attachment sites I, the reinforcement element 5 is extended with a metal sheet prolongation 27 in the travel direction x forwards up to the front subframe cross member 3.

As mentioned above, the rack-and-pinion steering gear 30 is arranged in the travel direction x behind the subframe cross member 3, while an electromechanical actuator 28 is arranged in the travel direction x anteriorly of the subframe cross member 3 as a further functional part, comprised of an electric motor and an actuating gear for example.

Figure 4:
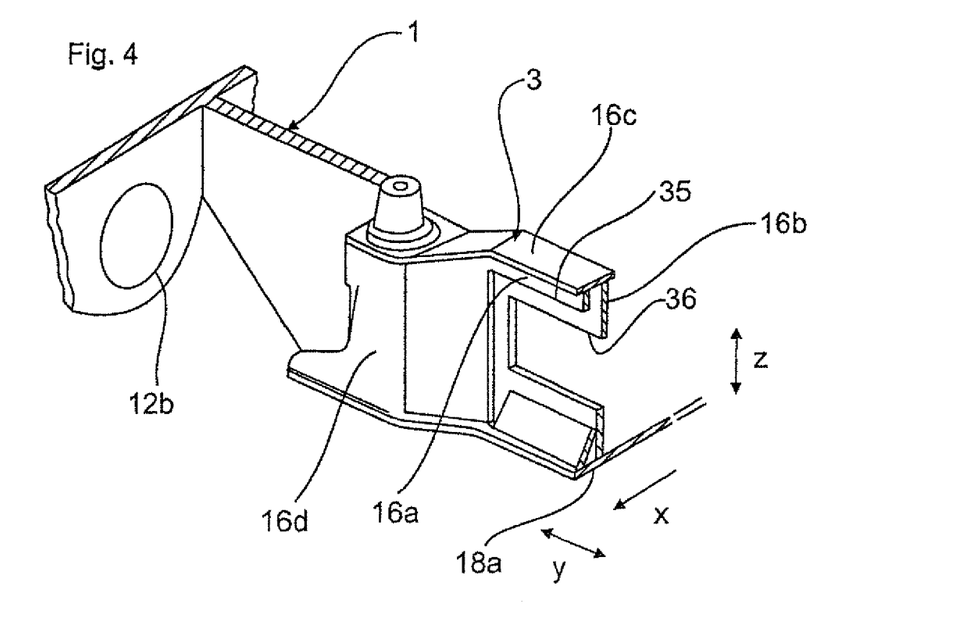
FIG. 4 a further three-dimensional partial view in the section plane of FIG. 2, without the steering gear and the actuator housing.

The actuator 28 positioned at the front in the exemplary embodiment acts on two split torsion bar stabilizers 32 which are rotatably guided on the node elements 1 with their transversely extending portions in bearing mounts 12*b* (FIGS. 2 and 4), respectively, and operatively interact via angled arms 32*a* (FIG. 1) with the indicated wheel guide elements 20 of the wheel suspensions.

Further, the steering gear 30, positioned behind the subframe cross member 3 is bolted to the node elements 1 on both sides thereof via not shown screw holes, with the not shown steering tie rod of the steering gear 30 being guided outwards by the downwardly open steering slots 17 and respectively articulated with steering knuckle arms of the wheel suspensions for steering the front wheels of the motor vehicle.

For spatial and constructive reasons, the steering gear 30 and the actuator 28 (FIG. 2) are to be arranged on the subframe as closely as possible to one another and to the subframe cross member 3. For functional reasons, the actuator 28 should have a predefined clearance s (indicated in FIG. 5) about the circular-symmetrical outer circumference thereof.

For this purpose, the subframe cross member 3 has a rectangular shape with a ratio of height to width (for example, 6:1) to ensure a high bending stiffness in the vehicle vertical direction, i.e. configured relatively narrow and arranged upright.

The subframe cross member 3 is hereby formed of two upright cross member walls 16a, 16b (cf. also FIGS. 3 to 5) and adjoining thereto of a lower flange 18a and an upper flange 16c. The lower flange 18a is formed in one piece with the flat metal sheet prolongation 27.

The cross member walls 16a, 16b and the lower flange 18a and the upper flange 16c of the subframe cross member 3 transition laterally into vertically oriented fastening eyes 16d (FIG. 4) and are rigidly bolted there from above and from below with the node elements 1.

Figure 3:
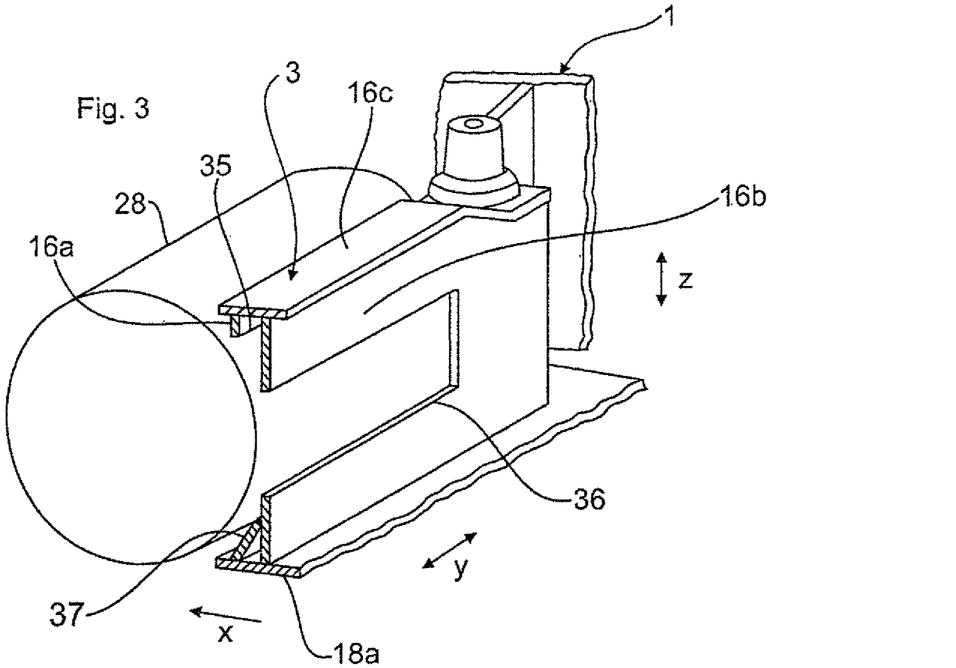
FIG. 3 a three-dimensional partial view in the section plane of FIG. 2, with dash-dotted contour line of the actuator housing adjacent to the subframe cross member in the absence of an illustration of a steering gear.

As shown in particular in FIG. 3, the outer circumference of the actuator 28 protrudes into the subframe cross member 3, for which purpose the cross member walls 16a, 16b are formed in their height with differently configured slot-shaped openings 35, 36 over the length of the actuator 28. The openings 35, 36 are delimited by wall frame parts of the front and rear cross member walls 16a, 16b, which ensure adequate bending stiffness of the subframe cross member 3 and which adjoin the continuous lower flange 18a and upper flange 16c, respectively.

Further, the lower wall frame part 37 (FIG. 5) of the front cross member wall 16a is folded obliquely from the lower flange 18a to the wall portion 39 (FIG. 5) of the rear cross member wall 16b and thus forms an inverted V-shaped hollow profile of high bending stiffness. 34 designates hereby the welds by which the wall portions of the walls 16a, 16b are welded to one another and firmly welded with the lower flange 18a.

Slanting the lower wall frame part 37 of the front cross member wall 16a also increases the penetration depth of the actuator 28 or the clearance s (FIG. 5) required for the actuator 28.

The invention is not limited to the embodiment described. Both the subframe and the subframe cross member 3 thereof may be configured differently depending on structural specifications or requirements at hand. For example, the subframe cross member 3 could also be configured at a different ratio of height to width and, optionally, both functional parts 28, 30 may protrude into the subframe cross member 3. Further, the subframe cross members 3 could also be configured as a separate component without connection to the metal sheet prolongation 27.

Instead of the steering gear 30 as the one functional part, provision could also be made, when a rear axle for motor vehicles is involved, for steering actuators which steer the rear wheels of the motor vehicle in a defined manner (four-wheel steering).

Figure 6:
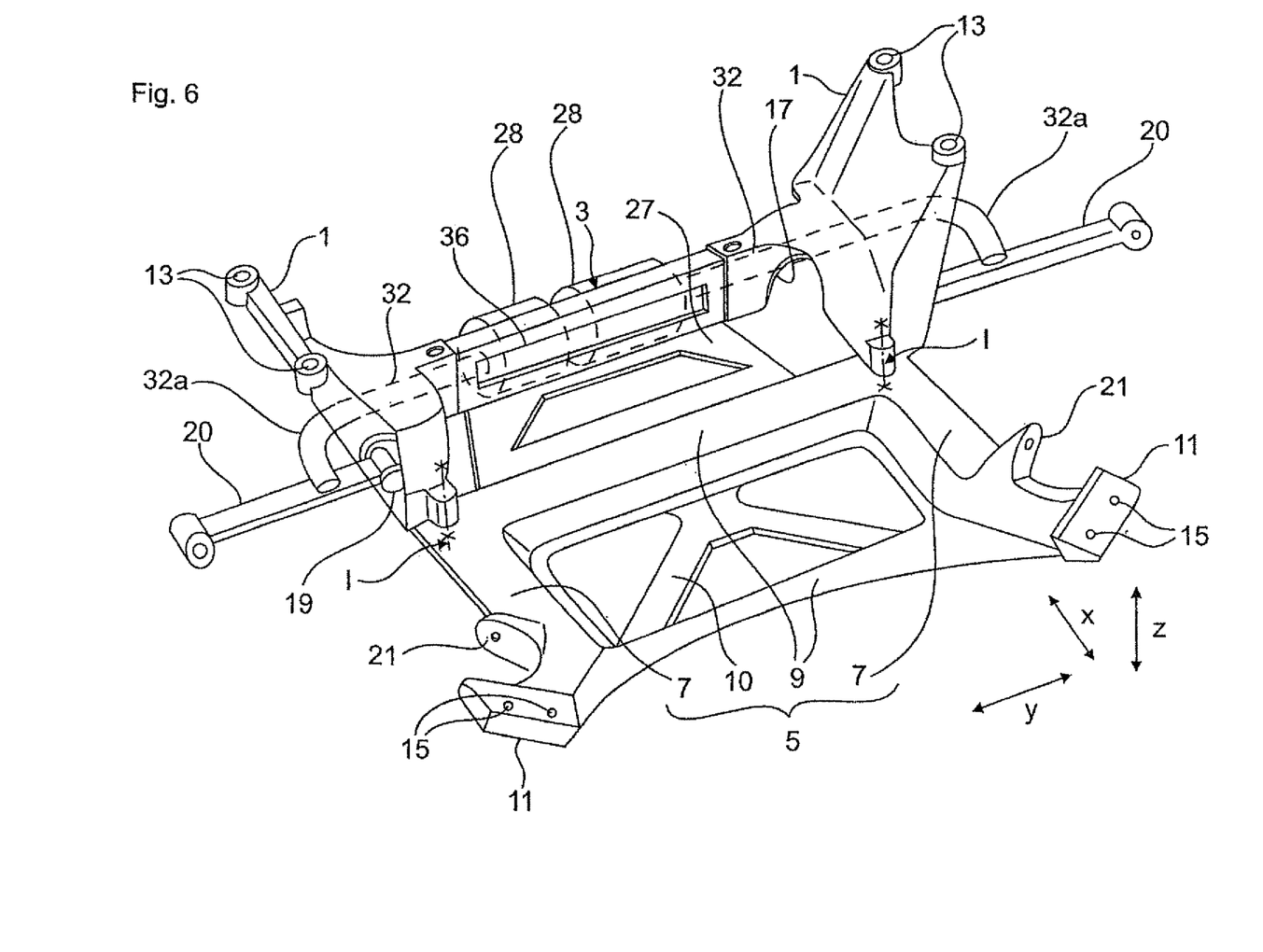
FIG. 6 a view corresponding to FIG. 1 of a further exemplary embodiment.

In the foregoing exemplary embodiment, the two torsion spring bars 32 are associated to a common actuator 28. As an alternative, each torsion spring bar 32 is provided with a separate actuator 28 as shown in FIG. 6. The two actuators 28 are in FIG. 6 functionally decoupled from each other and arranged in coaxial relation. Instead, the two actuators 28 may also be positioned at slight angular position to each other. Furthermore, the two actuators 28 may also be arranged in a common housing.

Figure 5:
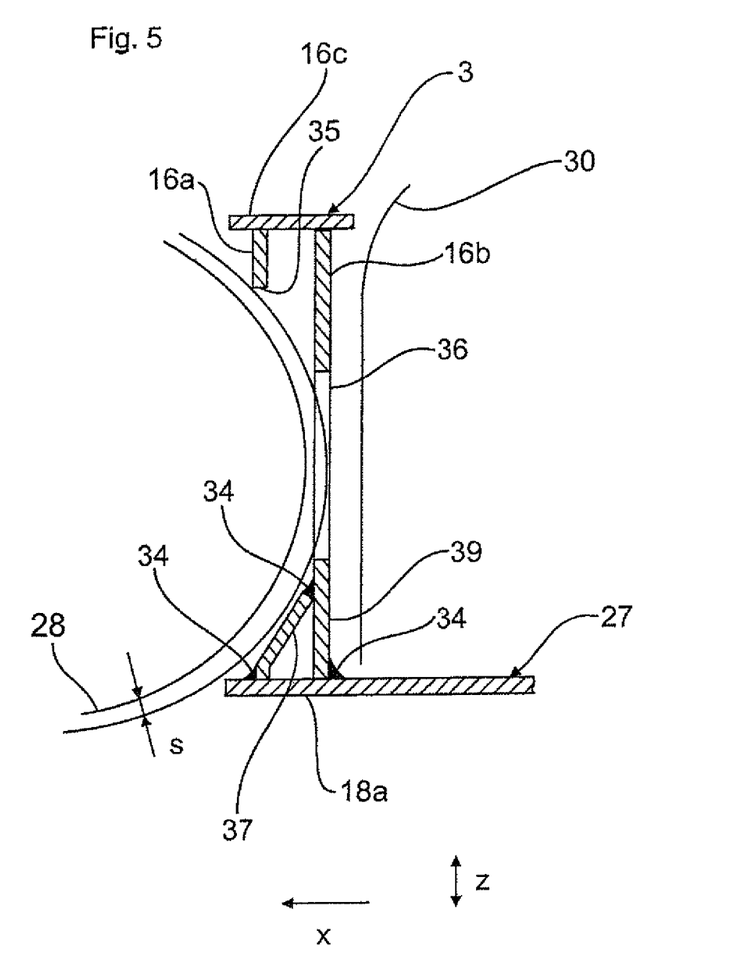
FIG. 5 an enlarged partial view of FIG. 2 of the functional parts in immediate proximity adjacent to the subframe cross member and the configuration of the subframe cross member with obliquely folded wall portion, which forms a hollow profile, on the lower flange forming a traverse bar.
Figure 7:
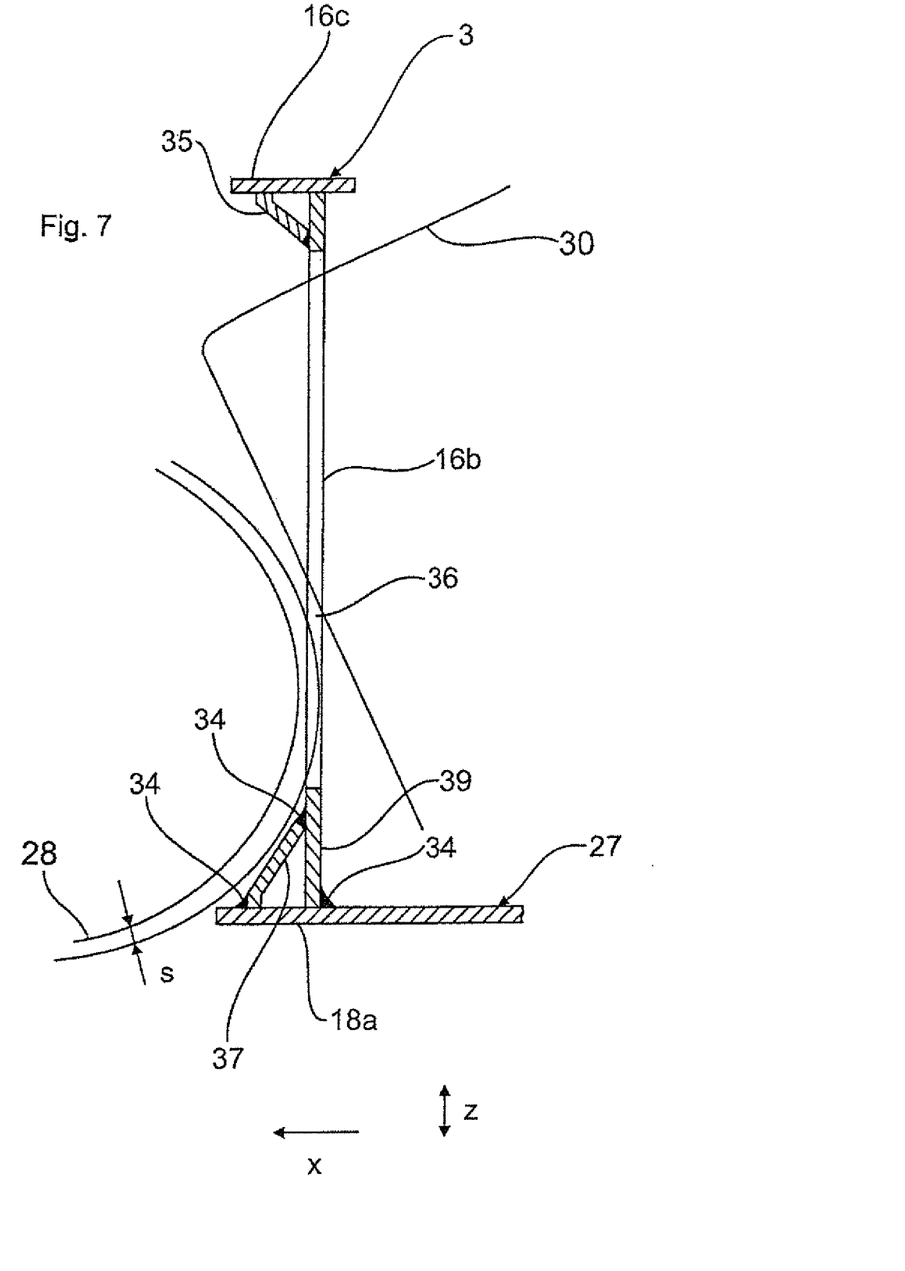
FIG. 7 a view corresponding to FIG. 5 of a further exemplary embodiment of the invention.

FIG. 7 shows a particularly space-beneficial configuration by way of a view corresponding to FIG. 5. In contrast to FIG. 5, not only the actuator 28 protrudes here into the openings 35, 36, but in addition also the steering gear 30. The steering gear 30 is hereby arranged with a height offset slightly interleaved above the actuator 28. Moreover, in FIG. 7, not only the lower frame wall part 37 is folded obliquely backwards, but also the upper frame wall part. As a result, the stiffness of the subframe cross member 3 is further enhanced. In addition, the installation space provided by the front opening 35 is enlarged.

As an alternative, the steering gear 30 alone may protrude into the openings 35, 36, whereas the actuator 28 is disposed in the travel direction x anteriorly of the subframe cross member 3, without protruding into the openings 35, 36 thereof.

What is claimed is:

1. A subframe for a motor vehicle, comprising:
two front node elements arranged in a vehicle transverse direction in spaced-apart relation for connection to a vehicle body;
a front subframe cross member configured to connect the two front node elements;
at least one functional part configured as a rotary actuator extending in the vehicle transverse direction adjacent to the subframe cross member and having torsion spring bars which act on a vehicle wheel suspension and are subjectable to a torsion;
said subframe cross member having an opening which provides installation space such that the functional part protrudes at least in part without contact to thereby define a clearance between the functional part and the opening of the subframe cross member; and
said torsion spring bars of the functional part configured as a rotary actuator being arranged in spaced-apart relation in a vehicle longitudinal direction and overlaps with the subframe cross member.

2. The subframe of claim 1, wherein the subframe cross member is constructed in the form of an upright profile having at least one cross member wall, said opening being formed in the cross member wall.

3. The subframe of claim 1, wherein the subframe cross member is configured to delimit the opening in the shape of a closed frame having upper and lower wall frame parts in a vertical direction and lateral wall frame parts in the vehicle transverse direction.

4. The subframe of claim 3, wherein the upper and lower wall frame parts and the lateral wall frame parts are all made of same material and/or formed in one piece in the cross member wall.

5. The subframe of claim 1, wherein the subframe cross member has a front cross member wall and a rear cross member wall, as viewed in the vehicle longitudinal direction, to define a cavity.

6. The subframe of claim 5, wherein the opening is formed in one of the front and rear cross member walls, the other one of the front and rear cross member walls defining also an opening.

7. The subframe of claim 6, wherein the functional part has an outer circumference which is substantially circular in shape, each said opening defining a height which is variably dimensioned to suit a contour of the protruding functional part.

8. The subframe of claim 5, wherein one of the front and rear cross member walls is arranged in closer proximity to the functional part in the vehicle longitudinal direction than the other one of the front and rear cross member walls and has an upper frame wall part and a lower frame wall part, with at least one of the upper and lower frame wall parts being folded obliquely at an angle of incline.

9. The subframe of claim 8, wherein the obliquely folded frame wall part forms with the other one of the front and rear cross member walls a closed hollow profile.

10. The subframe of claim 9, wherein the obliquely folded frame wall part is welded with the other one of the front and rear cross member walls.

11. The subframe of claim 5, wherein the subframe cross member defines a hollow profile which is delimited in a vertical direction by an upper flange and a lower flange, between which the cross member walls are arranged.

12. The subframe of claim 1, wherein the subframe cross member has at least one frame wall part which is folded obliquely at an angle of incline.

13. The subframe of claim 1, wherein the functional part extends transversely on one side of the subframe cross member, and further comprising a second transversely extending functional part on another side of the subframe cross member, said subframe cross member being arranged in a clearance between the two functional parts.

14. The subframe of claim 1, wherein the second transversely extending functional part is a steering gear.

* * * * *